United States Patent [19]

Ward

[11] 4,267,825

[45] May 19, 1981

[54] SOLAR HEAT COLLECTOR WITH HEAT PIPES

[75] Inventor: Dan S. Ward, Fort Collins, Colo.

[73] Assignee: Entec Products Corporation, Fort Collins, Colo.

[21] Appl. No.: 52,620

[22] Filed: Jun. 27, 1979

[51] Int. Cl.³ .................... F24J 3/02; F28D 15/00
[52] U.S. Cl. .................... 126/433; 126/436; 126/446; 165/105
[58] Field of Search ............. 165/105; 126/433, 435, 126/436, 446

[56] References Cited

U.S. PATENT DOCUMENTS 4,162,684 7/1979 Loveless ........................ 165/105

FOREIGN PATENT DOCUMENTS 948380 1/1949 France ........................ 165/105
981083 1/1965 United Kingdom ........... 165/105

*Primary Examiner*—Samuel Scott
*Assistant Examiner*—G. Anderson
*Attorney, Agent, or Firm*—Ralph F. Crandell

[57] ABSTRACT

A passive solar assistance device for use with a heat pump having a heat transfer fluid inlet and outlet, with means for circulating the fluid, a tank for containing an amount of the fluid, and at least one solar heat pipe having one end extending into the tank and adapted to be in contact with the fluid. At its opposite end the heat pipe is provided with a solar receiving device, such as an enclosed box having one or more transparent walls facing the sun or a plate construction comprising an extension of the heat pipe itself. In its heating mode, heat pipe is mounted at an angle of at least 30°, with the end associated with the solar receiving device in the lowermost position so that the heat pipe acts as a one way heat valve conducting heat from the solar receiving device to the fluid in the tank but not in the opposite direction. The heat pipe may be pivotally mounted to provide for either a heating mode or cooling mode.

9 Claims, 9 Drawing Figures

SOLAR HEAT COLLECTOR WITH HEAT PIPES

BACKGROUND OF THE INVENTION

1. Field of the Invention

The present invention relates to solar heat collectors and their combination with conventional heat pumps and, in particular, to a new and useful passive solar assistance device for use with a conventional heat pump to provide a source of heat for the heat pump in winter months or a heat sink for the heat pump when it is operated as a cooling unit in summer months.

2. Description of the Prior Art

Various solar heat collecting devices are known for utilizing the heat radiated from the sun. Solar heat collectors are also known which incorporate heat pipes for transporting this heat. Examples of these devices are found in U.S. Pat. No. 4,119,985 to Knowles et al. and U.S. Pat. No. 3,996,919 to Hepp.

Heat pumps are known which are driven by electricity and operated to pump heat to areas of relatively low temperature from areas of higher temperature. These conventional heat pumps may be operated either as cooling or refrigeration units for removing unwanted heat from one location and discharging it into another, or conversely, as heaters for removing heat from one location and discharging it into another area which requires heat. An electrically driven heat pump operates on the same principles as vapor-compressing space cooling units or air conditioners. Unlike a conventional air conditioner however, a heat pump has the additional capacity of providing winter space heating for buildings by, in effect, cooling the exterior ambient air and discharging the heat gained by this cooling to the interior of the building. Heat is drawn from the outside ambient air even when the temperature of this air falls below 70° F. An electrically driven heat pump is capable of providing two to four times the heat which can be provided by an electric resistance heater which uses an equivalent amount of electrical energy. This ratio of heat delivered by a heat pump to the amount of heat delivered by an electric resistance heater where both systems use an equivalent amount of electricity, is called the coefficient of performance or COP. The COP of heat pumps are generally in the range of about 2 to about 4.

The effectiveness of heat pumps however, is limited by the fact that they will operate and provide a COP of 2 to 4 only when the outdoor air temperature is greater than between about 45° to 50° F. At lower temperatures, the COP is reduced until, at a temperature of about 10° to 20° F., the heat pump can no longer of effectively draw any heat from the ambient outside air. At temperatures lower than these therefore, use must be made of electric resistance heating which has a COP of 1.

When a heat pump is used in its cooling mode, that is to act as an air conditioner for cooling a building, its efficiency and usefullness again will depend on the outside temperature and the heat pump's ability to shed excess heat drawn from the interior of the building. In a heating mode therefore, the effectiveness of a heat pump will depend on the heat which can be provided thereto and, in its cooling mode, the effectiveness of the heat pump will depend on its ability to shed excess heat.

SUMMARY OF THE INVENTION

The present invention is embodied in to a device for assisting a heat pump by providing as a source of relatively high temperature energy, a collection device which receives its heat from the sun. The invention is also directed to the construction of the solar collecting device itself and the utilization of heat pipes which act as one way heat vales to channel heat received from the sun into a storage area for providing a source of useful heat, or conversely, for channeling waste heat out of the storage area.

The invention provides a source of heat which can be used by a heat pump to permit its efficient operation even when the outside air temperature drops below the 45° to 50° F. range. The solar collecting device embodying the present invention is a passive one, that is a system which does not require pumps or blowers.

Accordingly, the present invention comprises a solar heat collector comprising a heat storage tank for containing a heatable fluid, such as water or a mixture of water and glycol or the like, a solar heat receiving means for receiving heat from the sun, and at least one heat pipe having one end at the solar heat receiving means and an opposite end in the fluid of the heat storage tank. The heat pipe is mounted, for heatng the fluid in the tank, at an angle of at least 30° with respect to the horizontal with the end of the heat pipe at the solar heat receiving means positioned lower than the opposite end. In this arrangement, the heat pipe acts as a one way heat valve transferring heat from the sun directly into the fluid.

A further object of the present invention is to provide the solar heat collector further includes means for pivotally or moveably mounting the heat pipe so that it can be positioned at about 30° to the horizontal with its opposite end in the lowermost position. In this orientation, the heat pipe again acts as a one way heat valve but this time for conducting heat out of the fluid.

The various features of novelty which characterize the invention are pointed out with particularity in the claims annexed to an forming a part of this disclosure. For a better understanding of the invention, its operating advantages and specific objects attained by its uses, reference is made to the accompanying drawings and descriptive matter in which preferred embodiments of the invention are illustrated and described.

DESCRIPTION OF THE PREFERRED EMBODIMENTS

Figure 1:
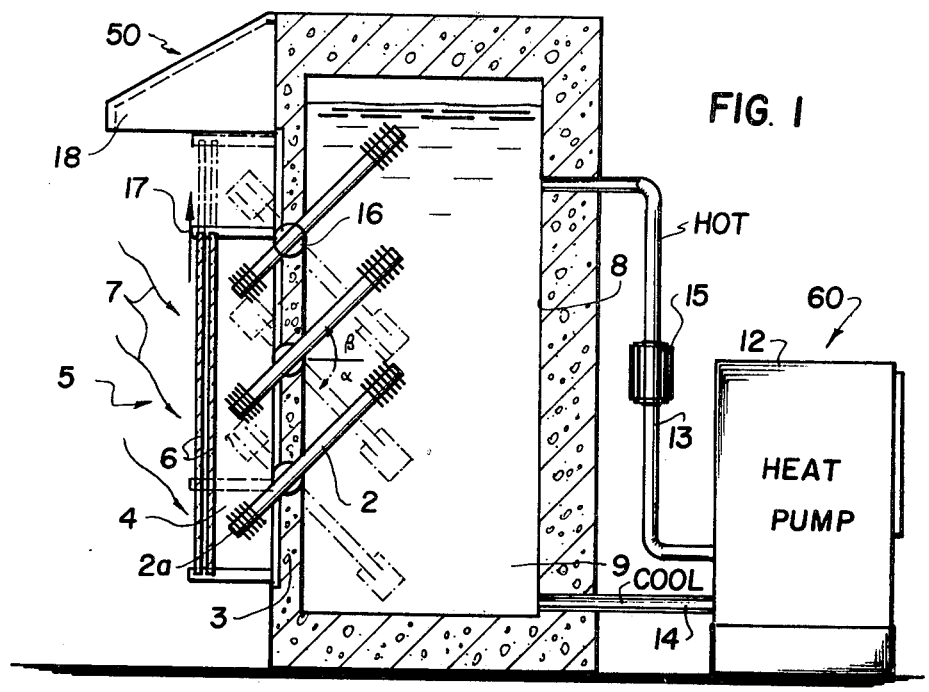
FIG. 1 is a side elevations cross-sectional view of one embodiment of a solar collector embodying the present invention showing its association in connection with a convention heat pump.

Referring to the drawings, the invention embodied therein comprises a passive solar assistance device generally designated 50 which can be used independentally or in combination with a conventional heat pump generally designated 60. FIG. 1 shows a system which uses a plurality of heat pipes 2 inclined at an angle $\beta$ which is greater than 30° and disposed within a wall 3 of a building to be heated. One end of each heat pipe 2 extends through wall 3 into solar receiving means in the form of a heat chamber 4, of a passive solar heater generally designated 5. Passive solar heater 5 comprises a transparent wall 6 which may be of double wall or thermopane construction to provide sufficient insulation so that chamber 4 is sufficiently heated by rays from the sun, indicated at 7. The end 2a of each heat pipe 2 is heated in solar heater chamber 4 and conducts heat into an insulated chamber 8 which contains a heat-retaining fluid 9 such as water or other fluid.

Figure 2:
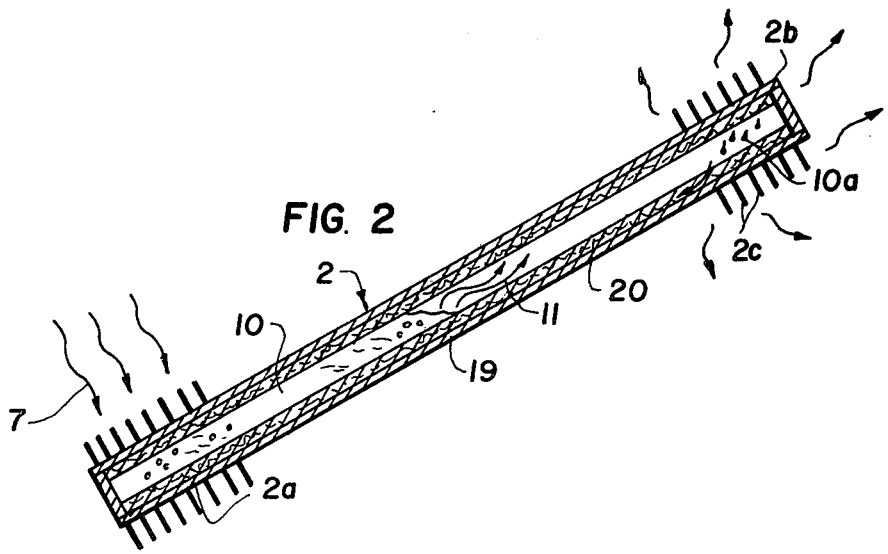
FIG. 2 is a side elevational sectional view of a heat pipe used in accordance with the present invention.

Heat pipes 2, which are better shown in FIG. 2, comprises one-way heat valves which permit fluid or medium 9 to be heated, when tubes 2 are inclined in the position shown in solid lines in FIG. 1, but not cooled. This is accomplished when rays 7 from the sun, heat the lower end 2a of the pipe 2, to vaporize water or other vaporizable material 10, which is contained in an airtight casing 19 of the tube 2. The vaporized fluid escapes at 11 and then condenses into droplets 10a at end 2b of tube 2 which heates the coolar heat medium 9 of chamber 8. Fluid flow is improved by wick material 20 lining casing 19. Fins 2c may be added to either end of tube 2 or along its entire length for enhancing the heat-exchanging characteristics of the heat pipes 2. A partial vaccuum is established in casing 19 to enhance vaporization whenever water or other liquid with a high boiling point is used as a working fluid. It can be seen that when the heat pipe 2 is inclined as shown in FIGS. 1 in solid and FIG. 2, heat from the medium 9 will not be conducted back out through wall 3 since the process is not readily reversible.

As shown in FIG. 1, a conventional heat pump 12 is provided with an inlet line 13, an outlet line 14 and supplied with warm water or fluid medium 9 from chamber 8 by pump 15 or circulation means within the heat pump. The heat in line 13 is utilized by the heat pump to produce heat which is useable in a dwelling or other structure. Thus, the passive solar heater 5 is utilized in conjunction with the heat pump 12 to supply the differential in temperature required to operate the heat pump 12. The overall system produces a well-controlled and defined heat dispersion.

In a modification of the system, each heat pipe 2 may be pivotally mounted at pivot points 16 within wall 3. During the winter months, the solar heater 5 may be positioned, as shown in solid line in FIG. 1, to obtain heat from solar rays 7 and heat a dwelling. In the summer months, solar heater 5 may be moved in the direction of arrow 17 into its dot-dash position with a corresponding pivoting of the pipes 2 in the clockwise direction to their dot-dash position. Here again, the tubes should be positioned at an angle $\alpha$ which is at least 30° to the horizontal. In the summer months, the functioning of heat pump 12 is reversed so that heat is taken from a dwelling and supplied to the heat reservoir 9, which now acts as a heat sink. Heat from the heat reservoir then travels through heat pipes 2 which again act as one-way heat valves, and supply heat out into the chamber 4 of the solar heater 5. Heat can thus be radiated out of the building in a controlled fashion.

An overhang 18 can be provided on the wall 3 at a position above the solar heater 5 so that rays 7 of the winter sun heat the solar heater, but so that the solar heater 5 in the summer months is shaded to enhance its heat-shedding function.

A conventional heat pump 12 operates by compressing a compressible fluid such as freon or other gas, and then permitting the fluid to expand. As is well known, the expansion of a fluid which has been compressed will absorb heat from its surrounding and thus cause a cooling effect on these surroundings. During the summer months when the heat pump is used as an air conditioning unit, this cooling effect is transmitted to the interior of a building or dwelling and in effect, heat is pumped from the interior of the building to the exterior thereof. In winter months when the heat pump is used for heating, the heat absorbed by the expanding fluid is transmitted to the interior of the building and this heat is absorbed from the exterior of the building. All of the forementioned functions are effected by well known heat transfer units within the heat pump, the specific structure of which do not form a part of this application. Conceptionally, the heat pump, in order to operate efficiently during winter months, merely needs a source of heat in the form of some fluid which has a temperature of above 40° F. For the heat pump to operate efficiently during the summer months, a heat shedding or heat sink must be provided which can accept the excess heat pumped out of the building. The present invention provides an efficient, simple and convenient source of heat which is tapped from the sun for the heat pump when it is operated during the winter and, a heat sink for the heat pump when it is operated in the summer. These same passive solar assistance devices can also be used independently of a heat pump for providing a source of heat in winter and a heat shedding apparatus in summer.

Figure 3:
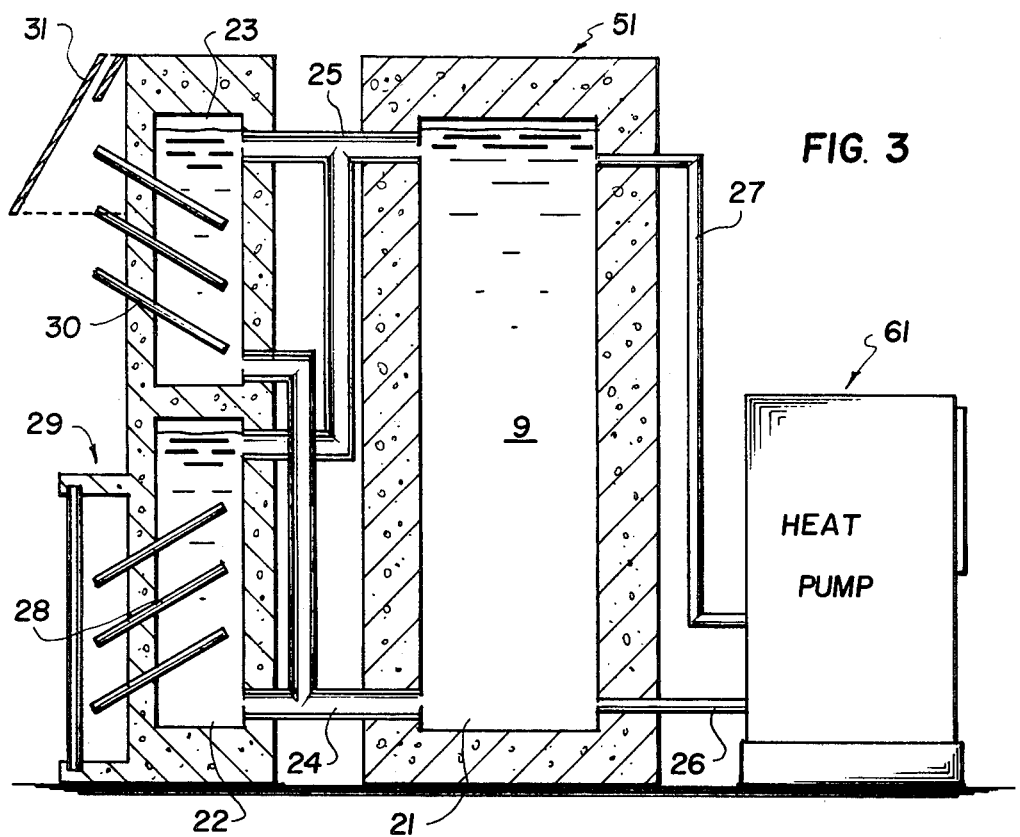
FIG. 3 is a side elevational view, in section, of another embodiment of the passive solar assistance device embodying the present invention.

An alternate embodiment of the invention is shown in FIG. 3. As with the embodiment shown in FIG. 1, a passive solar assistance device generally designated 51 is shown connected to a heat pump generally designated 61. Device 51 includes a main storage tank 21 which contains the heatable fluid 9 and is made of insulated material. Auxiliary tanks 22, 23 are also utilized and may be connected with tank 21 and through cool fluid line 24 and hot fluid line 25. Tank 21 is also connected to heat pump 61 through cool source line 26 and hot source line 27. During the winter months when heat pump 61 is used as a heater and requires a source of heat, heat pipes 28 which extend from solar receiving means 29 into auxiliary tank 22, accept heat from the sun and transmit it into heatable fluid 9 which is in tank 22. The heat transmitted to this fluid is not lost since, as already indicated, heat pipes 28 act as one-way valves since they are inclined at at least 30° to the horizontal with their ends to be heated at the lowermost position. Heat transmitted to auxiliary storage tank 22 is conducted through line 25 into the top of tank 21 and, the colder fluid in tank 21 is transmitted through line 24 into the bottom of tank 22. Passive circulation is thus instituted. Alternatively, heat pipes 28 may extend directly from solar receiving means 29 into tank 21.

When heat pump 61 is used as a cooling of air conditioning unit, solar receiving means 29 is shielded by a cover and heat pipes 30 extending into tank 23 act as one-way heat valves to remove heat from tank 23. The top ends of heat pipes 30 are shielded from the rays of the sun by hood 31. Since tank 23 is maintained at a cooler temperature than tank 21, fluid 9 tends to circulate in a direction reverse from the circulation of the fluid during the winter months. Warmer fluid in tank 21 thus flows through line 25 into tank 23 and cooler fluid of tank 23 flows through line 24 into tank 21. Heat pump 61 is thus provided with a heat sink or a heat shedding device. Alternatively to the passive means shown in FIG. 3, appropriate valves and circulators may be provided for better isolating the auxiliary tanks 22 and 23 from the main tank 21 and preventing a cross-heating or interference of the operation of these two units.

Figure 4:
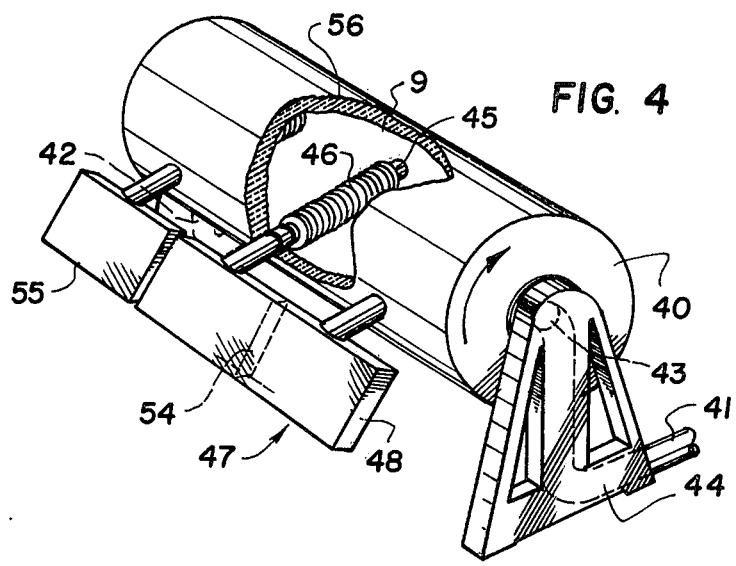
FIG. 4 is a perspective view of still a further embodiment of the invention.

A further embodiment of the invention is disclosed in FIG. 4. In this device, a cylindrical storage tank 40 is provided which contains the heatable fluid 9. Inlet and outlet lines 41 and 42 respectively are connected into tank 40 in the vicinity of its axis at 43. Tank 40 is pivotally mounted to vertical supports 44 only one of which is shown in FIG. 4. The connection of inlet and outlet pipes 41, 42 at the axis 43 of tank 40 facilitates the tank's mounting and its free rotation. Heat pipes 45 extend into tank 40 and may include fins 46 to improve heat transfer. At least one end of each heat pipe 45 extends out of the tank 40 and is associated with or connected to solar receiving means 47 which may be in the form of a box or plate arrangement 48 as shown in FIG. 4 or, a mere extension of the heat pipe as shown at 49 in FIG. 8.

Figure 8:
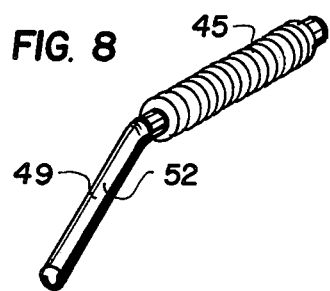
FIG. 8 is a perspective view of an alternate form for a heat pipe with a solar receiving means as used in the apparatus of FIG. 4.
Figure 9:
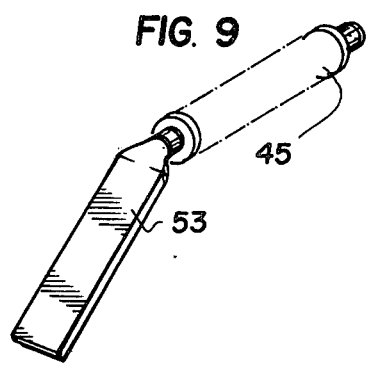
FIG. 9 is similar to FIG. 8, but of another form for the pipe and solar means.

The heat absorbing function of heat pipe end 49 is improved by painting the surface of this end in black paint as shown at 52 as illustrated in FIG. 8. In FIG. 9, a still further embodiment of the solar receiving means is shown in the form of a flattened pipe end 53 which, as with the pipe end 49 in FIG. 8, may be painted black on its surface to improve its heat reception from the sun. When the solar receiving means are in the form of box or plates 48, as shown in FIG. 4, they may either be a single plate connected to a plurality of heat pipes 48 and having fluid therein which is not separated between the pipes or be connected but include a partition 54 for separating the fluid between the pipes. Alternatively a separate box or plate arrangement 55 may be used which is separately connected to each heat pipe 45.

The solar receiving means shown in FIGS. 4, 8 and 9 is air-tight and under a vacuum with the fluid of the heat pipe 45 communicating with the interior of the solar receiving means.

As with the embodiments shown in FIGS. 1 and 3, the passive solar assembly shown in FIG. 4 may be used independently or in combination with a heat pump not shown in FIG. 4.

Figure 5:
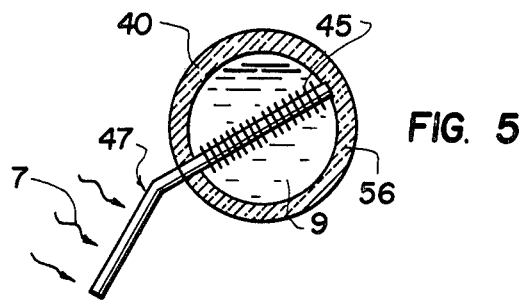
FIGS. 5, 6 and 7 are cross-sectional side elevational views of the embodiment shown in FIG. 4 illustrating three positions for the cylindrical storage tank.
Figure 6:
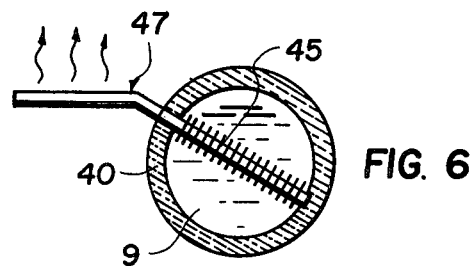
Figure 7:
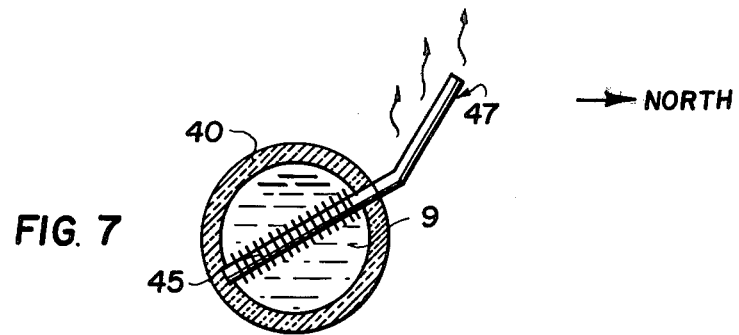

The operation of the embodiment of the solar assistance device shown in FIG. 4 is better understood with reference to FIGS. 5, 6 and 7. In FIG. 5, the heat pipes 45 are shown inclined at an angle of at least 30° with the end of the heat pipe connected to the solar receiving means 47 at the lowermost position. This orientation is easily achieved by rotating tank 40 on supports 44. In FIG. 5, the insulation 56 used to prevent heat loss from fluid 9 in tank 40 is shown. This insulation may be of any known type that is, fibrous, foam, and the like. In the arrangement of FIG. 5, rays of the sun at 7 heat the solar receiving means 47 and transmit this heat through pipe 45 which acts as a one-way heat valve into fluid 9. The heat of fluid 9 is utilized directly or transmitted to a heat pump through the inlet and outlet lines 41 and 42 respectively. When the apparatus of FIG. 4 is to be used as a heat sink or cooling facility, tank 40 is rotated about its axis into the position shown in FIG. 6 so that heat pipe 45 acts as a one-way heat valve to transmit heat out of the fluid 9. The position shown at FIG. 6 is most suited to night radiation when the sun does not heat the solar receiving means 47. In the position of FIG. 6 of course the solar receiving means 47 act as a heat radiator for shedding heat from the fluid 9. Heat is supplied to the fluid 9 from the heat pump which now is drawing heat from a dwelling or building to be cooled. For daytime heat shedding, the tank 40 is rotated into the position shown in FIG. 7 so that, with the heat pipe 45 again at an angle of 30° or greater, acts as a one-way heat valve to shed heat from the fluid 9. In installing the device shown in FIG. 4, care should be taken that the solar receiving means 47 faces south when tank 40 is in its position shown in FIG. 5, so that it is best oriented to receive heat from the sun, and so that when tank 40 is rotated into its position shown in FIG. 7, the sun receiving means which now act as a radiator, are facing away from the sun. As with the embodiments shown in FIGS. 1 and 3, suitably provided hoods or shades may be used for further blocking the rays of the sun from the means 47 when it is used as a radiator.

While specific embodiments of the invention have been shown and described in detail to illustrate the application of the principles of the invention, it will be understood that the invention may be embodied otherwise without departing from such principles.

What is claimed is:

1. A solar heat collector comprising, a heat storage tank containing a heatable fluid, solar heat receiving means for receiving heat from the sun comprising at least one heat pipe having one end for receiving solar heat and an opposite end in the fluid in said heat storage tank, means pivotally mounting said heat pipe to a wall of said tank through which said heat pipe extends whereby said heat pipe is positioned at an angle of at least 30° with respect to the horizontal with said one end lower than said opposite end when the fluid in said tank is to be heated and wherein said heat pipe is pivotable to an angle of at least 30° with respect to the horizontal with said opposite end lower than said one end for removing heat from the fluid in said tank, and an enclosed solar chamber slidably mounted on said wall of said tank through which said heat pipe extends for containing said one end of said heat pipe, said solar chamber including at least one transparent wall through which rays from the sun may pass to heat said one end of said heat pipe, said solar chamber being slidable downwardly for containing said one end of said heat pipe when it is in its lower position and slidable upwardly for containing said one end of said heat pipe when it is at its higher position.

2. A solar heat collector comprising, a heat storage tank containing a heatable fluid, solar heat receiving means for receiving heat from the sun comprising at least one heat pipe having one end for receiving solar heat and an opposite end in the fluid in said heat storage tank, means pivotally mounting said heat pipe to a wall of said tank through which said heat pipe extends whereby said heat pipe is positioned at an angle of at least 30° with respect to the horizontal with said one end lower than said opposite end when the fluid in said tank is to be heated and wherein said heat pipe is pivotable to an angle of at least 30° with respect to the horizontal with said opposite end lower than said one end for removing heat from the fluid in said tank, and an enclosed solar chamber slidably mounted to said wall of said tank through which said heat pipe extends for containing said one end of said heat pipe, said solar chamber including at least one transparent wall through which rays from the sun may pass to heat said one end of said heat pipe, said solar chamber being slidable downwardly for containing said one end of said heat pipe when it is in its lower position and slidable upwardly for containing said one end of said heat pipe when it is at its highest position, and a hood for shading said solar chamber when it is in its uppermost position.

3. A solar heat collector according to claim 1 wherein said heat pipe comprises an elongated hermetically sealed casing defining a chamber, a vaporizable fluid partially filing said chamber with a partial vacuum established in said chamber above said vaporizable fluid, and a wick lining said chamber through which said vaporizable fluid may pass.

4. A solar heat collector according to claim 3 wherein said heat pipe further includes a plurality of fins extending from said casing.

5. A solar heat collector according to claim 4 wherein said fins extend from said casing in the vicinity of said heat pipe ends.

6. A solar heat collector according to claim 4 wherein said fins extend from said casing along the entire length thereof.

7. A solar heat collector according to claim 1 further including a heat pump having an inlet and outlet line connected to said tank for receiving and discharging the fluid therefrom.

8. A solar heat collector according to claim 1 including at least one additional storage tank for containing an additional amount of the fluid, a cool fluid line connecting the bottoms of each of said storage tanks, and a warm fluid line connecting the tops of each of said storage tanks, whereby when the of fluid in said storage tanks is to be heated, heat is transmitted into the fluid of said tanks by said heat pipe and, when the fluid in said tanks is to be cooled, heat from said storage tanks is removed through said heat pipe.

9. A solar heat collector according to claim 8 further including a heat pump having an inlet line and an outlet line connected to said storage tank whereby said heat pump is supplied with warm fluid from said solar receiving means to operate said heat pump as a heating unit and provided with a heat receiving fluid in said main tank for discharging heat through said heat pipe when said heat pump is used as a cooling unit.

* * * * *